Figure 1:
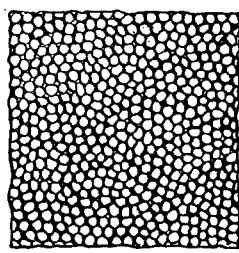

Nov. 20, 1962  D. S. CHISHOLM ETAL  3,065,190
METHOD FOR MAKING EXTRUDED POLYETHYLENE FOAMS
WHICH CONTAIN A STYRENE POLYMER
Filed Nov. 9, 1959

Polyethylene foam

Polyethylene foam with 1% by Wt. of polystyrene

INVENTORS.
Douglas S. Chisholm
Dale D. Freeman
Robert E. Holzinger
Harry H. Price
BY Griswold & Burdick
ATTORNEYS United States Patent Office 3,065,190
Patented Nov. 20, 1962

3,065,190
METHOD FOR MAKING EXTRUDED POLYETHYLENE FOAMS WHICH CONTAIN A STYRENE POLYMER
Douglas S. Chisholm and Dale D. Freeman, Midland, Robert E. Holzinger, Sanford, and Harry H. Price, Shepherd, Mich., assignors to The Dow Chemical Company, Midland, Mich., a corporation of Delaware
Filed Nov. 9, 1959, Ser. No. 851,586
6 Claims. (Cl. 260—2.5)

This invention relates to the production of polyethylene foam. It relates more particularly to a method and certain agents for making polyethylene foams of uniform fine cells and improved structure.

It is known to prepare porous or expanded polyethylene by incorporating a gas or a liquified normally-gaseous foaming agent in the molten polymer under pressure and to expand the polymer by a reduction in pressure during an extrusion process. For many purposes, it is desirable to produce the foam in the form of a sheet or rod. When the compositions are extruded it is difficult to obtain a foam in which the cell size is uniform and of small diameter and which foam has a smooth skin and good resiliency. Foams having cells of about two millimeters diameter or larger and of non-uniformity are less resilient than is desired for many purposes and restricts greatly the utility for which the polyethylene foams are otherwise well suited.

It is a primary object of the invention to provide a method and agents for producing polyethylene foams of uniform fine cells and improved structure. Another object is to provide a method and agents for extruding a polyethylene composition to produce foams of uniform individually-closed thin-walled small-diameter cells which foams have a smooth surface skin and improved structure and resiliency.

According to the invention the foregoing and related objects are obtained by blending polyethylene and a volatile organic foaming agent with a small amount of a thermoplastic homopolymer or copolymer of one or more monovinyl aromatic hydrocarbons of the benzene series or a copolymer of at least 70 percent by weight of at least one such monovinyl aromatic hydrocarbon and not more than 30 percent of acrylonitrile, under pressure to form a homogeneous mobile or flowable gel and thereafter extruding the gel into a zone of lower pressure sufficient to cause expansion of the extruded material with resultant formation of a foamed article of uniform fine cells and having good resiliency.

The polymers which are operable in this invention are homopolymers of monovinyl aromatic compounds such as styrene, vinyltoluene, vinylxylene, ethylvinylbenzene, isopropylstyrene, tert.-butylstyrene; copolymers of any two or more of such monovinyl aromatic compounds; and copolymers containing a major amount of styrene chemically combined or interpolymerized with acrylonitrile. Best results are obtained when the polymers are homopolymers or copolymers of one or more monovinyl aromatic hydrocarbons of the benzene series, such as styrene, vinyltoluene, vinylxylene, ar-ethylvinylbenzene, isopropylstyrene, tert.-butyl styrene, or copolymers of at least 70 percent by weight of at least one such monovinyl aromatic hydrocarbon and not more than 30 percent of acrylonitrile. The polymers can have a molecular weight corresponding to a viscosity characteristic of from about 2 to 100 centipoises as determined for a 10 weight percent solution of the polymer in toluene at 25° C.

The polymer or copolymer can be in finely divided or particulate form and is employed in proportions corresponding to from 0.1 to 3, preferably from 0.5 to 2, percent by weight of the polyethylene. Larger proportions of the styrene polymer results in non-uniform extrusions and produces foams of poor structure and surface skin.

Small amounts, e.g. from 0.5 to 2 percent by weight of the polyethylene of additives such as aluminum stearate, zinc stearate or other agents such as finely divided calcium silicate, diatomaceous earth, calcium carbonate, barium sulfate and the like can be employed, together with the styrene polymer as combined nucleating agents, but are not required in the invention, although a combination of one or more of such agents and the styrene polymer are advantageously used. A typical formulation suitable for making polyethylene foam of uniform fine cells in accordance with the invention is given in the recipe.

| Ingredients: | Parts by weight |
|---|---|
| Polyethylene | 100 |
| 1,2-dichlorotetrafluoroethane | 24 |
| Zinc stearate | 1 |
| Silene (principally finely divided calcium silicate) | 0.5 |
| Polystyrene or copolymer of 70 percent styrene–30 percent acrylonitrile | 1 |

The mobile or flowable gel is prepared by placing the ingredients under pressure of the foaming agent, suitably at temperatures above the crystalline melting point of the polyethylene, e.g. at from 90° to 200° C., such as by heating the ingredients in admixture with one another in a pressure resistant vessel or an extruder until a homogeneous or substantially uniform flowable gel is obtained. Thereafter, the gel is extruded into a zone of sufficiently lower pressure such as the atmosphere to cause the extruded material to expand with resultant formation of a cellular body.

The gel is preferably extruded at a temperature near or above the melting point of the polyethylene, but higher or lower temperatures can be used. The temperature at which the gel is extruded into the zone of lower pressure will vary depending in part upon the size and arrangement of the apparatus used, the rate of extrusion of the gel, the melting point of the polyethylene and the proportions and kind of volatile organic foaming agent or other additives employed. In general, the gel can be extruded at a temperature of from about 25° C. below the temperature at which crystallization of the polyethylene causes an observable cloudiness of the gel, up to a temperature of 25° C. above the melting point of the polyethylene. The temperature at which crystallization of the polyethylene causes a cloudiness of the gel can readily be determined by a simple test such as by sealing weighed amounts of the polyethylene and the foaming agent, e.g. 1,2-dichlorotetrafluoroethane, in a glass tube, heating the mixture to a temperature above the melting point of the polyethylene to obtain a transparent uniform gel, then cooling or allowing the gel to cool and observing the temperature at which the gel becomes hazy or cloudy. The temperature at which an observable cloudiness of the gel occurs is herein referred to as the "cloud point."

The pressure to be maintained on the gel prior to its extrusion in a zone of lower pressure should be at least as high as that of the vapor pressure of the volatile organic foaming agent and sufficient to prevent foaming in the extruder or discharge orifice. Pressures of from about 300 to 2000 pounds per square inch or higher, gauge pressure, can be used.

The volatile organic foaming agent should be a non-solvent or poor solvent for the polyethylene such as 1,2-dichlorotetrafluoroethane, but one that dissolves in the polymer in an amount up to about 30 percent by weight sufficient to form a mobile or flowable gel and expand the extruded gel to produce a cellular body. The foaming agent can be employed in amounts of from 0.05 to 0.5 gram molecular proportion per 100 grams of the polyethylene.

In practice, the polyethylene foams can be prepared by feeding solid granules of the polyethylene, together with the styrene polymer, e.g. polystyrene, in the desired proportion, into the feed hopper of a plastics extruder wherein the polymeric material is pressed and heated to its melting temperature and is forwarded by means of the screw into a mixing and blending zone wherein the heat-softened material is blended under pressure with a volatile organic foaming agent such as 1,2-dichlorotetrafluoroethane also fed to the mixing and blending zone of the extruder, to form a homogeneous mobile gel and is brought to a temperature between about 90° and 200° C., preferably from 90° to 120° C., then is extruded into a zone of lower pressure, suitably the atmosphere, wherein the extruded material expands with resultant formation of a foam of uniform fine individually-closed thin-walled cells. The foamed polyethylene of the invention is a light weight closed cell foam having a density of three pounds per cubic foot or less and the cells thereof have an average diameter of less than 2 millimeters. The products are useful as insulation, in packaging applications and for forming gaskets, etc.

The following examples illustrate ways in which the principle of the invention has been applied, but are not to be construed as limiting its scope.

EXAMPLE 1

Polyethylene having a melt index of 2, together with 1 percent by weight of zinc stearate, 0.5 percent of finely divided calcium silicate and 1 percent of granular polystyrene having a viscosity characteristic of 24 centipoises as determined for a 10 weight percent solution of the polystyrene in toluene at 25° C. was fed into a plastics extruder at a rate corresponding to 30 pounds of the mixture per hour. The plastics extruder employed in the experiment comprised a four foot long barrel having a 2½ inch diameter screw equipped with a mixing head similar in design to that described in U.S. Patent No. 2,453,088, and a sealing plate positioned midway of the screw. An inlet to the barrel of the extruder was provided adjacent to the sealing plate for feed of a volatile organic compound as blowing agent into the barrel and into contact with the heat-plastified polyethylene. The sealing plate formed a constricted passageway between the rim of the plate and the bore of the barrel so that flow of the heat-plastified polyethylene through the constricted passageway by pressure of the flights of the screw formed an effective plastic seal against counter-current flow or leakage of the volatile organic compound from the extruder. The heat-plastified polyethylene was forwarded under pressure of the screw around the sealing plate and into the second section of the barrel of the extruder wherein it was mixed with 1,2-dichlorotetrafluoroethane fed thereto at a rate of 7.5 pounds per hour. The resulting mixture was blended under pressure, principally by action of the mixing head on the screw of the extruder, into a uniform composition and was brought to a temperature between 100° and 104° C., then forced through a circular discharge orifice of 0.265 inch diameter into the atmosphere. The extruded material was allowed to expand freely in the air. The product was a cellular rod of about 1⅜ inches diameter and was composed of substantially uniform fine cells having an average diameter of about 0.5 millimeter. The product had a density of 1.9 pounds per cubic foot, has a smooth surface skin and had good resiliency.

Figure 2:
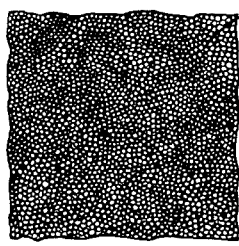

For purpose of comparison, polyethylene foam was prepared under similar conditions, but without the added polystyrene. The foam obtained by this procedure was composed of substantially uniform cells having an average diameter of 2 millimeters and was less resilient than the finer celled foam prepared in accordance with the invention. FIGS. 1 and 2 of the drawing show an enlarged cross-section of the polyethylene foams prepared by the above procedure and illustrate the relative ratio of the size of the cells.

Similar results were obtained when the experiments were repeated employing a commercial 6-inch diameter screw extruder. The method of the invention resulted in the production of polyethylene foam of more uniform fine cells and improved structure than was obtained in the absence of the polystyrene.

EXAMPLE 2

Polyethylene having a melt index of 2, together with 1 percent by weight of zinc stearate, 0.5 percent of finely divided calcium silicate and polystyrene having a viscosity characteristic of 6 centipoises, in amount as hereinafter stated was fed at a rate of 300 pounds per hour to a six inch diameter screw type extruder wherein it was pressed and heated at temperatures between 125° and 190° C., then was mixed with dichlorotetrafluoroethane fed under pressure to the extruder at a rate of 75 pounds per hour. The extruder comprised in combination a first pressing and heating zone wherein the polyethylene was heated at temperatures between 125° and 150° C., a second heating zone wherein the polyethylene was heated at temperatures of from 150° C. to 190° C., then was mixed with the 1,2-dichlorotetrafluoroethane in a third mixing and cooling zone wherein the ingredients were blended under pressure into a uniform flowable gel and brought to a temperature between 100° and 104° C. and were then extruded through a slot die of 5/32 x 3½ inches cross-section into the atmosphere. The extruded material foamed to form a cellular plank of about 1½ x 14 inches cross-section. The foamed product was of uniform fine cells and had a density of about 2 pounds per cubic foot. In each of a series of experiments, the proportion of polystyrene employed for controlling the size of the cells was as stated in the following table. Portions of the extruded product were observed under a magnifying glass and the average size of the cells was recorded. The results were as follows.

Table

| Polystyrene, weight percent: | Average size of cells in foam, mm. |
| --- | --- |
| None | 1.30 |
| 1 | 1.15 |
| 1.5 | 0.9 |
| 1.8 | 0.8 |
| 3.0 | 0.5 |

EXAMPLE 3

Polyethylene, together with 0.85 percent by weight of zinc stearate, 0.42 percent of finely divided calcium silicate and 0.85 percent of a copolymer of 70 percent by weight of styrene and 30 percent of acrylonitrile was fed at a rate of 30 pounds per hour into a 2½ inch diameter screw type extruder wherein it was pressed and heated to its melting point and up to 180–190° C., then was mixed with 1,2-dichlorotetrafluoroethane fed to a mixing and cooling section of the extruder at a rate of 7.5 pounds per hour. The resulting mixture was blended under pressure and brought to a temperature between 100° and 104° C. then was extruded through a circular die of 0.265 inch diameter into the atmosphere. The extruded material foamed to form a cellular rod approximately 1¼ inches in diameter and having a density of 2 pounds per cubic foot. Portions of the polyethylene foam were observed under a microscope. The average size of the cells was 0.7 millimeter.

Polyethylene foam prepared under similar conditions without the copolymer of styrene and acrylonitrile was found to have cells of 1.4 millimeter diameter.

We claim:

1. A method for making extruded polyethylene foams of uniform fine cells and resilient structure, which method comprises intimately incorporating polyethylene and from 1 to 3 percent by weight of a thermoplastic styrene polymer selected from the group consisting of the homopolymers and copolymers consisting of at least two dissimilar monovinyl aromatic hydrocarbons of the benzene series having the vinyl radical directly attached to a carbon atom of the benzene nucleus and copolymers of at least 70 percent by weight of at least one such monovinyl aromatic hydrocarbon and not more than 30 percent of acrylonitrile, with a volatile organic foaming agent having a boiling point at atmospheric pressure below the melting point of the polyethylene and which is a nonsolvent for the polyethylene, under superatmospheric pressure to form a flowable gel, bringing said gel to a temperature between 90° and 200° C. and above the boiling point of the volatile organic foaming agent, and thereafter extruding said gel into a zone of sufficiently lower pressure to cause the extruded material to expand with resultant formation of a cellular polyethylene foam.

2. A method according to claim 1, wherein the styrene polymer is polystyrene.

3. A method according to claim 1, wherein the styrene polymer is a copolymer of at least 70 percent by weight of styrene and not more than 30 percent by weight of acrylonitrile.

4. A method according to claim 1, wherein the volatile organic foaming agent is dichlorotetrafluoroethane.

5. A method for making extruded polyethylene foams of uniform fine cells and resilient structure, which method comprises intimately incorporating polyethylene, from 1 to 3 percent by weight of polystyrene, from 0.1 to 2 percent of zinc stearate, from 0.1 to 2 percent of finely divided calcium silicate and from 0.05 to 0.5 gram molecular proportion of dichlorotetrafluoromethane per 100 grams of the polyethylene, with one another under superatmospheric pressure to form a flowable gel, bringing said gel to a temperature between 90° and 200° C. and extruding said gel into a zone of sufficiently lower pressure to cause the extruded material to expand with resultant formation of a cellular polyethylene foam.

6. A method for making extruded polyethylene foams of uniform fine cells and resilient structure which method comprises intimately incorporating polyethylene, from 1 to 3 percent by weight of a copolymer of at least 70 percent by weight of styrene and up to 30 percent by weight of acrylonitrile, from 0.1 to 2 percent of zinc stearate, from 0.1 to 2 percent of finely divided calcium silicate and from 0.05 to 0.5 gram molecular proportion of dichlorotetrafluoroethane per 100 grams of the polyethylene, with one another under super-atmospheric pressure to form a flowable gel, bringing said gel to a temperature between 90° and 200° C. and extruding said gel into a zone of sufficiently lower pressure to cause the extruded material to expand with resultant formation of a cellular polyethylene foam.

References Cited in the file of this patent

UNITED STATES PATENTS

| | | |
|---|---|---|
| 2,515,250 | McIntire | July 18, 1950 |
| 2,577,743 | De Long | Dec. 11, 1951 |
| 2,849,028 | Clark et al. | Aug. 28, 1958 |
| 2,948,664 | Rubens et al. | Aug. 9, 1960 |